United States Patent [19]

Swoboda

[11] Patent Number: 4,672,228
[45] Date of Patent: Jun. 9, 1987

[54] BATTERY BACKUP SYSTEM FOR SWITCHED POWER SUPPLY

[75] Inventor: Jack W. Swoboda, Los Angeles, Calif.

[73] Assignee: Pioneer Magnetics, Inc., Santa Monica, Calif.

[21] Appl. No.: 772,134

[22] Filed: Sep. 3, 1985

[51] Int. Cl.⁴ .............................................. H02J 9/06
[52] U.S. Cl. ........................................ 307/66; 307/64; 361/90
[58] Field of Search ...................... 307/64, 66; 320/40, 320/43; 361/90, 91, 92, 93

[56] References Cited

U.S. PATENT DOCUMENTS

| | | | |
|---|---|---|---|
| 3,059,164 | 10/1962 | Johnson | 363/141 |
| 3,573,483 | 4/1971 | White | 307/66 |
| 3,599,070 | 8/1971 | Davis | 307/66 X |
| 3,603,973 | 9/1971 | Hough | 307/66 |
| 3,757,131 | 9/1973 | Krutz et al. | 307/66 X |
| 3,771,012 | 11/1973 | Niederjohn | 307/66 X |
| 3,795,818 | 3/1974 | Beaman et al. | 307/66 |
| 4,065,676 | 12/1977 | Elias | 307/66 |
| 4,327,298 | 4/1982 | Burgin | 307/66 |
| 4,368,499 | 1/1983 | Stifter | 361/89 X |
| 4,400,661 | 8/1983 | Duley | 307/66 X |
| 4,510,400 | 4/1985 | Kiteley | 307/66 |
| 4,564,767 | 1/1986 | Charych | 307/66 |
| 4,595,872 | 6/1986 | Ball | 307/66 X |

Primary Examiner—William M. Shoop, Jr.
Assistant Examiner—Shik Luen Paul Ip
Attorney, Agent, or Firm—Keith D. Beecher

[57] ABSTRACT

A battery back-up system providing a short term hold-up for a converter type switched power supply. The back-up system includes a regulated charger circuit for maintaining the battery in a charged condition and a direct current fan which cools the power supply in both the normal and battery back-up modes. Over-voltage protection for the system is provided during the battery back-up mode, and protection for the battery is provided against excessive battery charging voltages. The fan and regulator are automatically turned off when the battery reaches a deep discharge condition to protect the battery.

6 Claims, 4 Drawing Figures

SELF OSCILLATING BUCK OSCILLATOR REGULATOR -100-

| FIG. 2A |
| FIG. 2B |

BATTERY BACKUP SYSTEM FOR SWITCHED POWER SUPPLY

BACKGROUND OF THE INVENTION

In many applications it is essential for a power supply to continue operating in the event power from the alternating current mains is interrupted. For that reason, battery back-up power supplies are known in which a battery is automatically switched into the power supply system to maintain the direct current output voltage of the system at least on a temporary basis, should the alternating current power be interrupted.

The present invention provides an improved, relatively simple and inexpensive battery back-up system which is constructed particularly for use in conjunction with an auxiliary channel of a converter type of switched power supply, and which incorporates circuitry for maintaining the battery in a charged condition during normal operation of the system, as well as built-in circuitry for protecting the battery and the system against excessive charge voltages and excessive power drain.

A feature of the invention is the provision of a fan which is operational during the normal mode and battery back-up mode of the system, to cool the power supply, and which is automatically turned off along with the auxiliary channel when the battery reaches a deep discharge condition, so as to protect the battery.

DETAILED DESCRIPTION OF THE ILLUSTRATED EMBODIMENT

Figure 1:
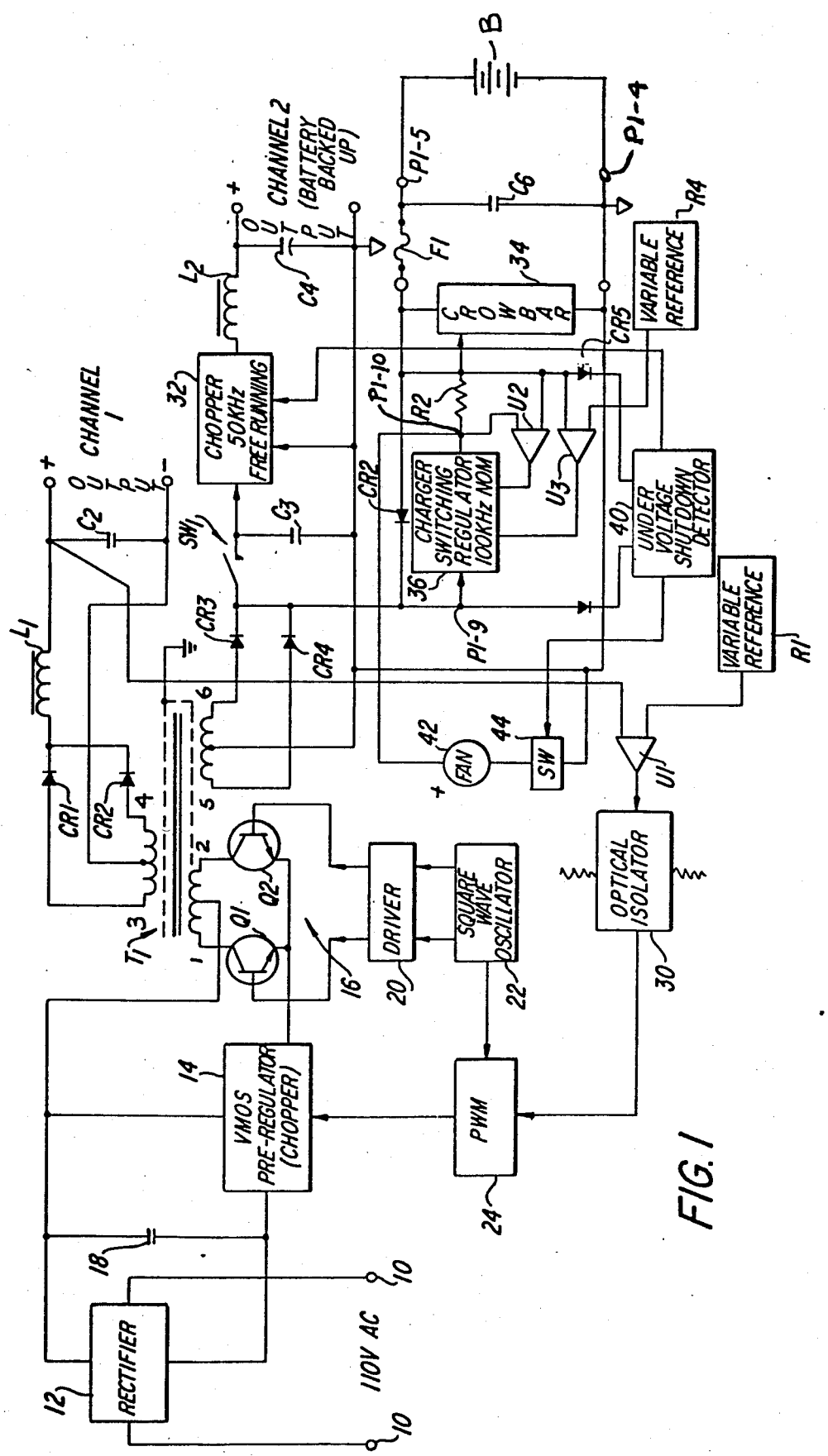
FIG. 1 is a diagram, partly in circuitry and partly in block form of a switched power supply having two output channels, and with a battery back-up system incorporating the concepts of the present invention connected to one of the channels.

The circuit of FIG. 1 includes input terminals 10, which are connected to the usual 110-volt alternating current mains, and which connect a typical rectifier 12 to the mains. The rectifier produces a direct current output which is introduced through a VMOS preregulator chopper 14 to a typical push-pull inverter circuit 16. A capacitor 18 is connected across the output of rectifier 12 to provide input storage.

Inverter 16 includes a driver 20 which is controlled by a square wave oscillator 22. Driver 20 is connected to a pair of PNP switching transistors Q1 and Q2, as shown, which, in turn, are connected across a primary winding 1-2 of a power output transformer T1. The squarewave oscillator is also connected to a pulse width modulator 24 which controls the preregulator 14.

Transformer T1 includes a first secondary winding 3-4 which is connected through a pair of diodes CR1, CR2 and through a choke coil L1 to the output terminals of Channel 1. A capacitor C2 is connected across the output terminals. These elements form a typical rectifier, so that a direct current voltage appears across the output terminals of Channel 1.

The positive output terminal is connected through a differential amplifier U1 and through an optical isolator 30 to the pulse width modulator 24 to provide a regulation control for the power supply. The other input of amplifier U1 is connected to a variable reference R1 so that the output voltage may be established.

The circuitry and components described above form a part of a typical prior art switched power supply, and it is believed that a detailed description of these known components is unnecessary.

Transformer T1 includes a second secondary winding 5-6 which is connected to the anodes of a pair of diodes CR3 and CR4 whose cathodes are connected together and through a switch SW1 to any appropriate regulator, such as a series regulator, or a buck regulator in the form of a free-running chopper 32, to regulate the output voltage of a second output channel designated Channel 2. The center tap of winding 5-6 is connected to ground, and a capacitor C3 is connected between the input of the regulator and ground. The output of regulator 32 is connected through a choke coil L2 to the positive output terminal of Channel 2, the negative output terminal being grounded. A capacitor C4 is connected across the output terminals. A second direct current output voltage of the power suply is provided across the output terminals of Channel 2.

In the illustrated embodiment of the invention, a battery back-up circuit incorporating the concepts of the invention is provided for Channel 2. The battery back-up circuit includes an SCR "crowbar" circuit 34 connected through a fuse f1 to terminal P1-5. A capacitor C6 is connected between the terminal P1-5 and a grounded terminal P1-4. A back-up battery B is connected across the terminals P1-5 and P1-4.

A charger switching regulator 36, which will be described in more detail in FIGS. 2A and 2B, has its input connected to the cathodes of diodes CR3, CR4, and the output of the charger 36 is connected through a resistor R2 to crowbar circuit 34 to provide charging current for battery B during normal operation of the power supply.

The charger 36 is also connected to one input of a differential amplifier U2. The junction of resistor R2 and the crowbar circuit 34 is connected to the other input of amplifier U2, to one input of a second differential amplifier U3, and through a diode CR5 to an undervoltage shut-down detector 40. The outputs of amplifiers U2 and U3 are connected to charger 36. The other input of amplifier U3 is connected to a variable reference R4.

The charger 36 is connected to one terminal of a direct current fan 42 whose other terminal is connected to ground through a switch 44. The fan is energized so long as switch 44 is closed. The undervoltage shut-down detector 40 causes switch 44 to open and turn off the fan 42 when the voltage of battery B drops below a minimum threshold during the battery back-up mode. When that occurs, the under-voltage shut-down detector 40 also turns off the regulator 32 to disable Channel 2, so as to reduce the load on battery B to a negligible level in order to protect the battery.

As stated above, the system of the invention maintains regulation on the output of Channel 2 in the event of failure of the main power supply. Channel 2 includes a buck regulator in the form of chopper 32, and the system of the invention automatically provides a direct current input to the buck regulator from battery B should the main power fail. The direct current input from the battery is provided directly to the input of regulator 32, so that the regulator serves to regulate the voltage output of Channel 2 both during normal operation of the system and during the battery back-up mode.

Accordingly, no separate regulator is required for the battery back-up mode. Also, the transition from the main power to battery back-up occurs in a smooth and uninterrupted manner.

Diode CR2 serves as a transfer diode. During normal operation of the power supply, diode CR2 is back-biased, and battery B is disconnected from regulator 32. At this time battery B receives a charge from charger 36. Should the main power fail, diode CR2 becomes conductive connecting the battery to the input of regulator 32, and the fully charged battery is then used to maintain the voltage output from Channel 2.

Fan 42 runs off the output of charger 32 during normal operation of the power supply, and it runs off battery B during the battery back-up mode of operation. Accordingly, the fan continues to run during the battery back-up operation to cool the power supply even during the latter mode. This continues until the battery voltage drops below a certain minimum, and in order to protect the battery, at that point, the fan is automatically turned off by the under-voltage detector 40 opening switch 44.

A number of protective features are provided. For example, under-voltage shut-down detector 40 looks at the voltage of battery B, and should the battery voltage decrease below a certain minimum, the under-voltage detector 40 operates switch 44 to turn off the fan 42 to protect battery B. The under-voltage detector also serves to turn off the regulator 32 and disable Channel 2 during the battery back-up mode, should the battery voltage drops below the particular minimum, also to protect the battery.

Another protective feature in the system of the invention serves to protect battery B from over-voltage should the charger 36 fail, and to protect the load connected to Channel 2 during the battery back-up mode, should regulator 32 fail. For example, should charger 36 go to an over-voltage condition, the crowbar circuit 34 fires and blows fuse f1 to disconnect the battery. Also, as will be described subsequently, should regulator 32 fail during the battery back-up mode, so that the output voltage from Channel 2 increases above a safe threshold insofar as the load is concerned, the crowbar circuit will fire and blow fuse f1 to disconnect the battery, which is the source of power for the output voltage of Channel 2 during the battery back-up mode.

Figures 2, 2A:
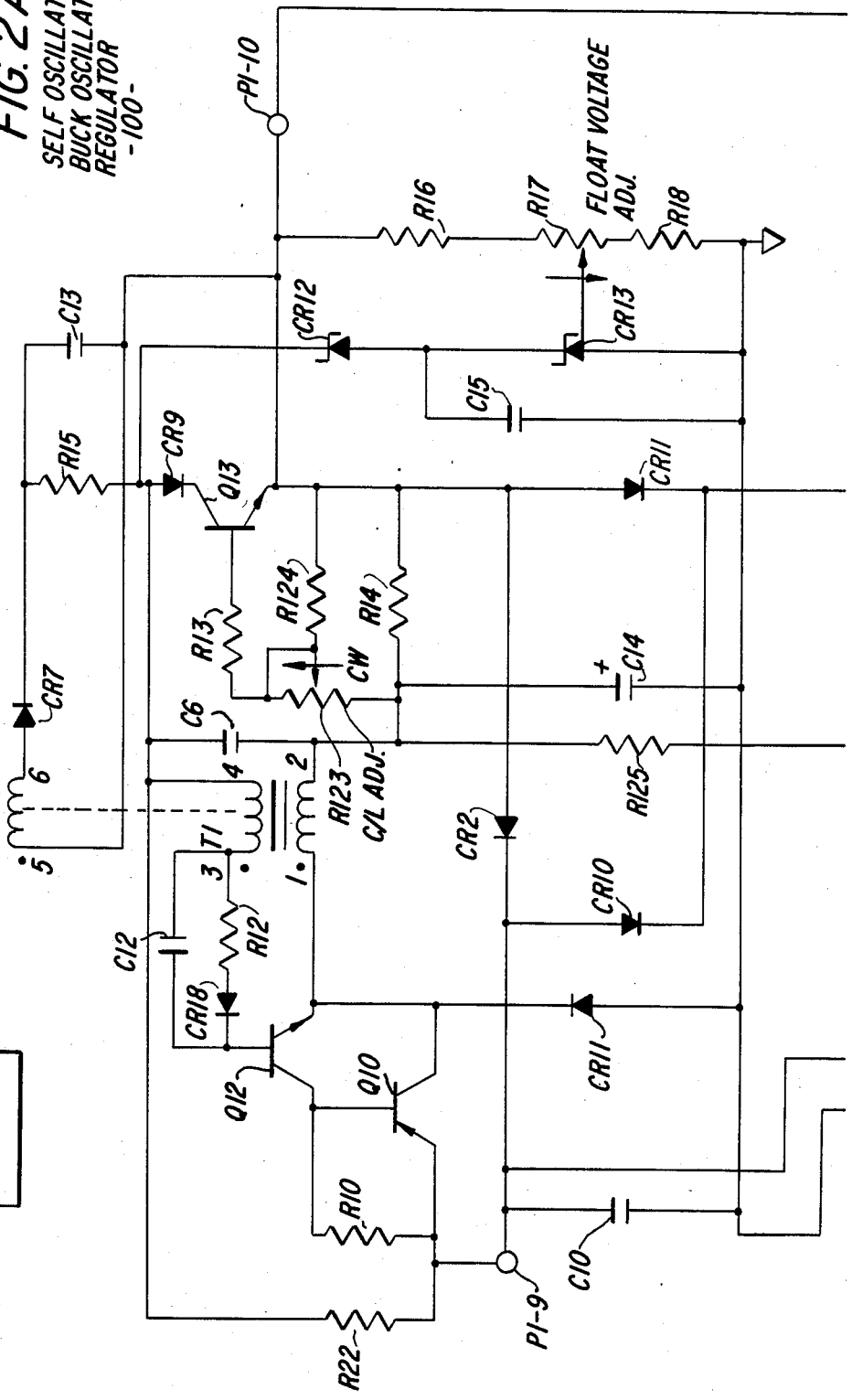
FIGS. 2, 2A and 2B together represent a circuit diagram of the back-up system of FIG. 1.
Figure 2B:
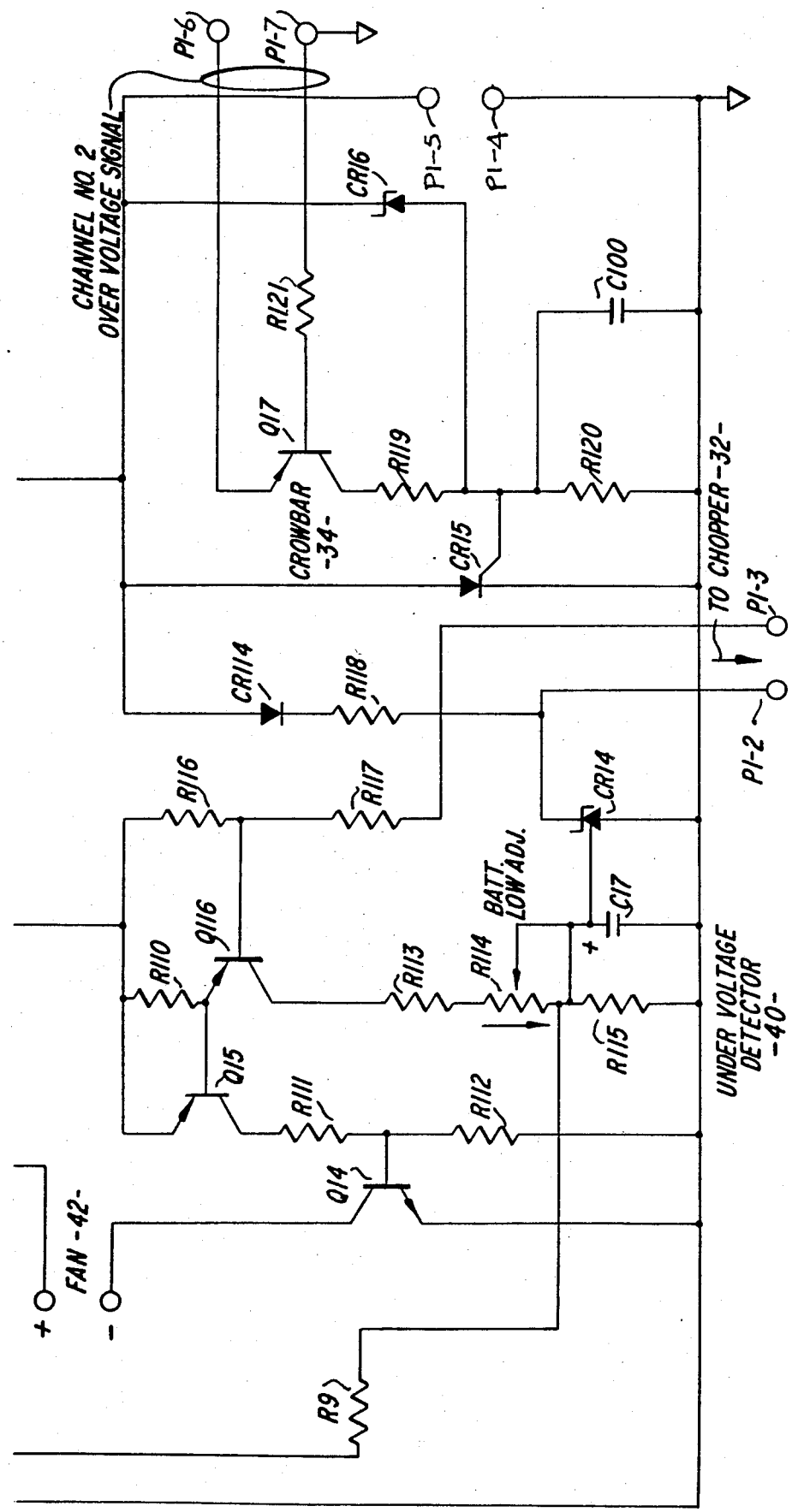

As stated above, the back-up battery circuit of FIG. 1 is shown in circuit detail in FIG. 2. The battery back-up circuit of FIG. 2 includes a self-oscillating buck oscillator 100 which is described and claimed in copending application Ser. No. 722,348, filed April 12, 1985, Bruce L. Wilkinson, entitled "Self-Oscillating Regulator Circuit". The self-oscillating regulator 100 serves to step down the output voltage of channel 2 to the battery float voltage. The input terminal P1-9 of the regulator is connected to the input of channel 2, as shown in FIG. 1, and the battery is connected to the same point through isolation diode CR2.

The regulator 100 converts the direct current input voltage from diodes CR3 and CR4 in Channel 2 (FIG. 1) into a regulated direct current output corresponding to the float voltage of the battery B. This circuit, as described in detail in the copending application Ser. No. 722,348 includes a PNP transistor Q10 which is connected in circuit with an NPN transistor Q12. Transistor Q10 may be of the type designated D45C11 and transistor Q12 may be of the type designated 2N3019. A 10 ohm resistor R10 is connected between the base and emitter of transistor Q10. The base of transistor Q12 is coupled to terminal 3 of a winding 3-4 of transformer T1 through a 0.33 microfarad capacitor C12. Capacitor C12 is shunted by a 10 ohm resistor R12 and a diode CR18.

A reference voltage source is provided which includes an NPN transistor Q13 which may be of the type designated 2N2222A having a 100 ohm resistor R13 connected to its base. Resistor R13 is connected to side 2 of primary winding T1 through a potentiometer R123 which may have a resistance of 500 ohms. Potentiometer R123 serves as a capacity/inductance adjustment to control the rate of oscillation of the circuit. The potentiometer is also connected to emitter of transistor Q13 through a 0.47 ohm resistor R14, and the wiper of the potentiometer is connected to the emitter through a 510 ohm resistor R124.

The emitter of transistor Q13 is connected to an output terminal P1-10 of the regulator, and is connected back to input terminal P1-9 through the blocking diode CR2. The collector of transistor Q13 is connected through a pair of Zener diodes CR12 and CR13 to ground. The common connection between the Zener diodes is connected to a 0.1 microfarad grounded capacitor C15.

The discharge threshold of Zener diode CR13 is controlled by a 1 kilo-ohm potentiometer R17 which serves as an adjustment for the voltage output of the regulator circuit, so that the voltage may be stepped down to correspond with the float voltage of the battery. Potentiometer R17 is connected between the output terminal P1-10 and ground through a 20 kilo-ohm resistor R16 and a 1.58 kilo-ohm resistor R18.

Potentiometer R123 is connected to a grounded 390 microfarad capacitor C14. The emitter of transistor Q13 is also connected to a diode CR11 and the emitter of transistor Q10 is connected to a diode CR11. Zener diode CR12 is of the type designated 1N968B and Zener diode CR13 is of the type designated TL430. The threshold of Zener diode CR13 may be adjusted by adjustment of the float voltage adjustment potentiometer R17.

The emitter of transistor Q12 and the collector of transistor Q10 are connected through a diode CR10 to ground. Terminal P1-9 is connected to a grounded 1 microfarad capacitor C10.

The collector of NPN transistor Q13, which may be of the type designated 500117, is connected through a diode CR9 to a 470 ohm resistor R15. Resistor R15 is connected through diode CR7 to one side 6 of a third winding 5-6 of transformer T1. Side 5 of that winding is connected to the emitter of transistor Q13. A 0.22 microfarad capacitor C13 is connected between side 5 of winding 5-6 and diode CR7.

The transistors Q10, Q12, diode CR10, transformer T1 and capacitor C14 form a self-oscillating switching regulator, which attempts to keep the voltage across capacitor C14 equal to the direct current voltage at terminal 4 of transformer T1. When transistors Q10 and Q12 are conducting, the input voltage is applied to terminal 1 of transformer T1. The inductance of winding 1-2 of the transformer acts as a choke and capacitor C4 charges up. At the same time, a voltage is induced on winding 3-4 of transformer T1 of a polarity to maintain transistors Q10 and Q12 conducting.

When capacitor C14 is charged up sufficiently, the base-emitter voltage of transistor Q12 begins to diminish. This tends to turn off transistor Q12, and, therefore, transistor Q10 is also turned off. This change is coupled by way of transformer T1 back to the base of transistor Q12 which is regeneratively turned off. The current in winding 1-2 of transformer T1 is taken up by flywheel diode CR10 and, as the load draws current from capacitor C14, its voltage diminishes. Capacitor C14 continues to discharge until the base-emitter voltage of transistor Q12 increases, which tends to turn transistor Q12 on. This tendency is again coupled back to the base of transistor Q12, regeneratively turning transistor Q12 on.

Diodes CR3 and CR4 connected to winding 5-6 of transformer T1 (FIG. 1) generate a direct current voltage for the base drive for transistor Q12 at higher load currents. Transistor Q13 is a current limiter. The load current induces a voltage across resistor R14, and this voltage is sampled by transistor Q13. When the base-emitter voltage of transistor Q13 approaches, for example, 0.6 volts, transistor Q13 becomes conductive, pulling terminal 4 of transformer T1 down, and reducing the control voltage of the oscillator circuit thereby limiting the output. Zener diode CR13 is shunt regulator which sets the voltage control point for side 4 of transformer T1 from the voltage reference source.

The operation of the regulator 100 is more fully described in the copending application. The regulated voltage from the regulator, adjusted to correspond with the float voltage of the battery B, appears at terminal P1-10, which is connected to battery terminal P1-5, and to a Zener diode CR16 which may be of the type designated IN973B. Battery B is connected across terminals P1-5 and P1-4, as explained above.

Zener diode CR16 is connected to the junction of a 270 ohm resistor R119 and a grounded 100 ohm resistor R120. Resistor R120 is also connected to a grounded 0.1 microfarad capacitor C100. The junction of resistors R119 and R120 is connected to the control electrode of a silicon controlled rectifier CR15 contained in the crowbar circuit 34. The silicon controlled rectifier may be of the type designated 2N6400. Resistor R119 is connected to the collector of a PNP transistor Q17 which may be of the type designated 2N2907. The emitter of transistor Q17 is connected to a terminal P1-6. The base of transistor Q17 is connected through a 200 ohm resistor R121 to grounded terminal P1-7. Silicon controlled rectifier CR15 is connected between output terminal P1-10 and ground. Output terminal P1-10 is also connected through a diode CR114 and through a 200 kilo-ohm resistor R118 to a terminal P1-2.

Terminal P1-2 and terminal P1-3 are connected to regulator 32 to turn off the regulator when the voltage of battery B drops below a particular minimum. Terminal P1-3 is connected to a 3 kilo-ohm resistor R117 which, in turn, is connected to the base of a PNP transistor Q16 and to a 360 ohm resistor R117. Transistor Q16 may be of the type designated 2N2907. Resistor R116 is connected to the base of diode CR11, and to a 2 kilo-ohm resistor R110. Resistor R110 is connected to the emitter of transistor Q16.

The circuit also includes a PNP transistor Q15 which may be of the type designated 2N2907, and whose emitter is connected to resistor R110, and whose collector is connected through a 2.2 kilo-ohm resistor R111 to a grounded 1 kilo-ohm resistor R112 and to the base of a PNP transistor Q14 which may be of the type degignated 2N3019. The emitter of transistor Q14 is grounded, and its collector is connected to one terminal of fan 42. The other terminal of the fan is connected through a 33 ohm resistor R125 to the junction of potentiometer R123, and resistor R14.

The collector of transistor Q16 is connected through an 8.66 kilo-ohm resistor R113 to a 25 kilo-ohm potentiometer R114. The wiper of potentiometer R114, and the other side of the potentiometer are connected to a grounded 1 kilo-ohm resistor R115. The wiper of potentiometer R114 is also connected to a grounded 10 microfarad capacitor C17 and to an adjustable Zener diode CR14 of the type designated TL430. The Zener diode is connected to ground and to resistor R118. Potentiometer R114 adjusts the battery threshold at which both fan 42 and chopper 32 are turned off.

The input to Channel 2 (the cathodes of diodes CR3, CR4 in FIG. 1) is in the range of 35-50 volts in the case of a 24-volt system, depending upon Channel 1 output voltage and loading. This voltage is used by Channel 2 to provide its direct current output voltage. The voltage is also stepped down to the battery float voltage by regulator 100 operating, for example, at a nominal frequency of 100 KHz. The charging current for battery B is limited to a nominal 1.5 amps which is adjustable. When the main supply fails, the diode CR2 conducts the current from the battery to the input of regulator 32 in FIG. 1. This transition is achieved automatically, smoothly and in an uninterrupted manner. The regulator then continues to regulate the output of Channel 2 under battery back-up in the same manner as when supplied by the main power source.

Power for fan 42 is derived from the output of the battery charger 36 during normal operation of the system, and from the battery B during the battery back-up mode. When the battery voltage drops to the lower limit, as set by potentiometer R114, the under-voltage detector 40 inhibits chopper 32 and turns off fan 42 and regulator 32 leaving about 1 milliamp of current drain on the battery.

If an over-voltage condition occurs in regulator 32, the main channel is shut down and transistor Q17 becomes conductive so that the crowbar circuit of silicon controlled rectifier CR15 is fired. This blows a battery protection fuse f1 disabling the output of regulator 32. If the charger switching regulator 100 fails, the crowbar silicon controlled rectifier CR15 is fired by the resulting excessive battery voltage again blowing the battery fuse f1.

Zener diode CR13 is a shunt regulator which sets the voltage control point of transformer T1. Transistor Q16 and Zener diode C14 form a regenerative latch with hysteresis. When alternating current power is applied, Zener diode CR 14 is placed in the conducting state which causes current to flow between terminals P1-2 and P1-3 so as to enable regulator 32 in FIG. 1. Also, transistor Q16 is placed in the conducting state which keeps diode CR14 conductive even if the alternating current input power is removed. In addition, transistor Q15 is conductive which causes transistor Q14 to conduct allowing fan 42 to operate.

When the battery voltage drops below the deep discharge protect threshold with the alternating current input power removed, CR14 becomes non-conductive which breaks the circuit between terminals P1-3 and P1-2 disabling the regulator 32 in FIG. 1, and also causing transistor Q16 to become non-conductive which, in turn, causes the voltage at the reference terminal of CR14 to drop even more thereby regeneratively turning off diode CR14. Transistor Q15 also becomes non-conductive in the process which, in turn, causes transistor Q14 to become non-conductive to turn off the fan 42. This condition, as stated above, reduces the drain on the battery B to a low value.

The silicon controlled rectifier CR15 and Zener diode CR16, in conjunction with fuse f1 in the battery circuit, form the over-voltage protection circuit. If the voltage at the output terminal of the charger 36 rises above the over-voltage threshold, the Zener diode CR16 breaks down, turning on the crowbar silicon controlled rectifier CR15. The battery B then causes a large current to flow into the silicon controlled rectifier which blows the battery fuse f1 thereby isolating the battery from the high voltage.

In addition, if the battery voltage applied becomes too large for any reason, the current again blows the fuse f1 thereby protecting the circuit of Channel 2 from damage.

Transistor Q17 allows the over-voltage signal from Channel 2 to trip the crowbar silicon controlled rectifier C15 thereby protecting the load from over-voltages under battery back-up conditions.

The circuit and system of the present invention, accordingly, provides short term hold-up for channel 2 of the power supply. The system provides both charging and deep discharge protection which is necessary to promote a long battery life.

The system also provides over-voltage protection for Channel 2 and for excessive battery charge voltages. In addition, the system powers a direct current fan which cools the power supply under both normal and battery back-up modes. To protect the battery, the fan is turned off after a battery deep discharge condition.

In the embodiment described above, the system is capable of providing up to 3 amps of battery charging current, but is typically set to 1.5 amps to obtain a 1-10 charge rate with a 15 AH battery. The maximum current is adjustable. The system operates in a constant-current mode at the abovementioned limit until the battery voltage rises to the float voltage which is also adjustable. The mode of operation then becomes constant voltage, thereby yielding maximum battery life, while providing a rapid battery recharging cycle.

The low battery protect feature is adjustable. This feature incorporates hysteresis to prevent the rise in battery voltage which occurs with load removed from enabling the power supply after low battery protect shut-down has occurred In order to reset the circuitry, alternating current input power must be re-applied.

It will be appreciated that while a particular embodiment of the invention has been shown and described, modifications may be made. It is intended in the claims to cover all modifications which come within the true spirit and scope of the invention.

I claim:

1. A battery back-up system for an alternating current powered switched power supply, said power supply producing a direct current output, said power supply including a voltage regulator circuit, and said battery back-up system serving to maintain the direct current output from said power supply in the event of an alternating current power interruption, said back-up system including: a battery; terminal means connected to said battery; a battery charging circuit; first circuit means connecting the input of said charging circuit to said power supply for causing said power supply to energize said charging circuit during normal operation of the power supply, second circuit means connecting the output of said battery charging circuit to said terminal means for supplying a charging current to said battery during normal operation of the power supply; third circuit means connecting the battery to the input of said voltage regulator circuit, said third circuit means including blocking means for causing the battery to supply power to the input of the voltage regulator circuit only when the voltage of the power supply drops below a predetermined level; a fan for cooling the power supply; circuitry connecting the fan to the output of the battery charging system to energize the fan during normal operation of the power supply and connecting the fan to the terminal means to energize the fan from the battery during alternating current power interruptions; and an under-voltage detector connected to the terminal means for disconnecting the fan during alternating current power interruptions but only when the battery voltage drops below a particular minimum threshold.

2. The system defined in claim 1, in which said under-voltage detector includes circuitry for creating an hysteresis effect to prevent re-activation of the fan in the presence of transient voltage increases.

3. The system defined in claim 1, and which includes an under-voltage detector connected to said voltage regulator circuit for disabling said power supply during alternating current power interruptions, but only when the battery voltage drops below a particular minimum threshold.

4. The system defined in claim 3, in which said under-voltage detector includes circuitry for creating an hysteresis effect to prevent re-activation of said power supply in the presence of transient voltage increases.

5. The system defined in claim 1, and which includes an over-voltage detector connected to the output of said voltage regulator circuit for disconnecting the battery when the output voltage of said power supply exceeds a particular maximum threshold.

6. The system defined in claim 1, and which includes an over-voltage detector connected to the output of said battery charging circuit for disconnecting the battery when the output voltage of said battery charging circuit exceeds a particular maximum threshold.

* * * * *